US009271438B2

(12) United States Patent
Reade et al.

(10) Patent No.: US 9,271,438 B2
(45) Date of Patent: Mar. 1, 2016

(54) AGRICULTURAL IMPLEMENT TOOL SUPPORT SYSTEM

(71) Applicant: Great Plains Manufacturing, Incorporated, Salina, KS (US)

(72) Inventors: Kevin Lee Reade, Salina, KS (US); Gregory W. Arnett, Solomon, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 170 days.

(21) Appl. No.: 13/954,592

(22) Filed: Jul. 30, 2013

(65) Prior Publication Data

US 2015/0034343 A1    Feb. 5, 2015

(51) Int. Cl.
   *A01B 63/00* (2006.01)
   *A01B 21/08* (2006.01)
   *A01B 61/04* (2006.01)

(52) U.S. Cl.
   CPC ............. *A01B 63/008* (2013.01); *A01B 21/086* (2013.01); *A01B 63/004* (2013.01); *A01B 61/046* (2013.01)

(58) Field of Classification Search
   CPC ........ A01B 15/18; A01B 35/16; A01B 35/28; A01B 63/004; A01B 63/008; A01B 63/023; A01B 63/24; A01B 63/111; A01B 21/086; A01B 61/046
   See application file for complete search history.

(56) References Cited

U.S. PATENT DOCUMENTS

| 2,648,271 | A |   | 8/1953 | Youngs |
| 4,178,999 | A |   | 12/1979 | Hansen |
| 4,183,411 | A |   | 1/1980 | Bourquin |
| 4,203,494 | A |   | 5/1980 | Hansen |
| 4,210,210 | A |   | 7/1980 | Ankenman |
| 4,947,770 | A | * | 8/1990 | Johnston ...................... 111/121 |
| 5,347,939 | A |   | 9/1994 | Hood, Jr. et al. |
| 5,431,232 | A |   | 7/1995 | Kirsch |
| 5,462,124 | A | * | 10/1995 | Rawson ........................ 172/569 |
| 6,659,193 | B1 | * | 12/2003 | Best et al. ..................... 172/566 |
| 7,159,523 | B2 | * | 1/2007 | Bourgault et al. ............ 111/187 |
| 7,628,218 | B2 | * | 12/2009 | Cresswell ..................... 172/763 |
| 7,762,345 | B2 |   | 7/2010 | Rozendaal et al. |
| 8,636,077 | B2 | * | 1/2014 | Bassett ........................ 172/195 |
| 8,910,581 | B2 | * | 12/2014 | Bassett ........................ 111/121 |
| 2003/0164125 | A1 | * | 9/2003 | Paluch et al. .................. 111/56 |
| 2012/0292060 | A1 |   | 11/2012 | Rozendaal et al. |

OTHER PUBLICATIONS

Search Report and Written Opinion dated Nov. 11, 2014 for related PCT Patent Application No. PCT/US2014/047861, filed Jul. 24, 2014, 12 pages.

* cited by examiner

*Primary Examiner* — Jamie L McGowan
(74) *Attorney, Agent, or Firm* — Hovey Williams LLP

(57) ABSTRACT

Systems for mounting a plurality of agricultural tools on a transverse support bar and a method for operating an agricultural implement having a transverse support bar. The systems include a lateral positioning structure that can attach to the transverse support bar and a detachable base that can be releasably coupled to the lateral positioning structure.

21 Claims, 9 Drawing Sheets

AGRICULTURAL IMPLEMENT TOOL SUPPORT SYSTEM

FIELD OF THE INVENTION

This invention relates generally to agricultural tools. More particularly, this invention relates to agricultural implement tool support systems and methods of operating an agricultural implement.

BACKGROUND OF THE INVENTION

Certain agricultural implements can employ a number of individual agricultural tools for working the soil or aiding in the treatment (e.g., spraying or fertilizing) of crops or soil. However, not all agricultural tools will be needed at all times. For this and other reasons, certain agricultural implements are designed such that agricultural tools can be attached to and/or removed from the implement. However, certain agricultural tools can be heavy and bulky, making the removal and/or attachment process difficult for the user. Furthermore, when attaching or reattaching a tool, positioning the agricultural tool in the proper orientation to the ground, and relative to other tools on the implement, can be difficult. Accordingly, there is a need for an agricultural tool support system that can securely and easily attach and remove agricultural tools to and from an agricultural implement.

SUMMARY OF THE INVENTION

In one embodiment of the present invention, there is provided an agricultural implement tool support system for mounting a plurality of agricultural tools on a transverse support bar of an agricultural implement. The tool support system includes a lateral positioning structure, a detachable base, and a vertically-adjustable support assembly. The lateral positioning structure is configured for rigid attachment to the transverse support bar of the implement along the length of the transverse support bar. The detachable base is removably coupled to the lateral positioning structure. The vertically-adjustable support assembly has a first portion shiftably coupled to the detachable base and a second portion configured for supporting an agricultural tool.

The position of the vertically-adjustable support assembly relative to the detachable base is adjustable and fixable so as to set a desired vertical position for the agricultural tool.

In another embodiment of the present invention, there is provided a tool support system for mounting a plurality of agricultural tools on a transverse support bar of an agricultural implement. The tool support system includes a lateral positioning structure, a detachable base, one or more releasable connectors, and a tool support assembly having a first portion coupled to the detachable base and a second portion configured for supporting an agricultural tool. The detachable base is configured for rigid attachment to the transverse support bar of the implement along the length of the transverse support bar. The detachable base is removably coupled to the lateral positioning structure. The releasable connectors are configured for removably coupling the detachable base to the lateral positioning structure. The lateral positioning structure includes an upper projection and a lower contact surface, while the detachable base includes an upper recess and a lower engagement surface. When the detachable base is coupled to the lateral positioning structure, the upper projection of the lateral positioning structure is received in the upper recess of the detachable base and the lower engagement surface of the detachable base is held against the lower contact surface of the lateral positioning structure with a holding force provided by the connectors.

In yet another embodiment of the present invention, there is provided a method of operating an agricultural implement having a transverse support bar. The method includes the steps of: (a) removing a first agricultural tool from a first lateral positioning structure attached to the transverse support bar; and (b) subsequent to step (a) attaching the first agricultural tool or another agricultural tool to the first lateral positioning structure. Between steps (a) and (b), the first lateral positioning structure remains fixed to the transverse support bar at a first lateral location.

BRIEF DESCRIPTION OF THE FIGURES

Embodiments of the present invention are described herein with reference to the following drawing figures, wherein.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
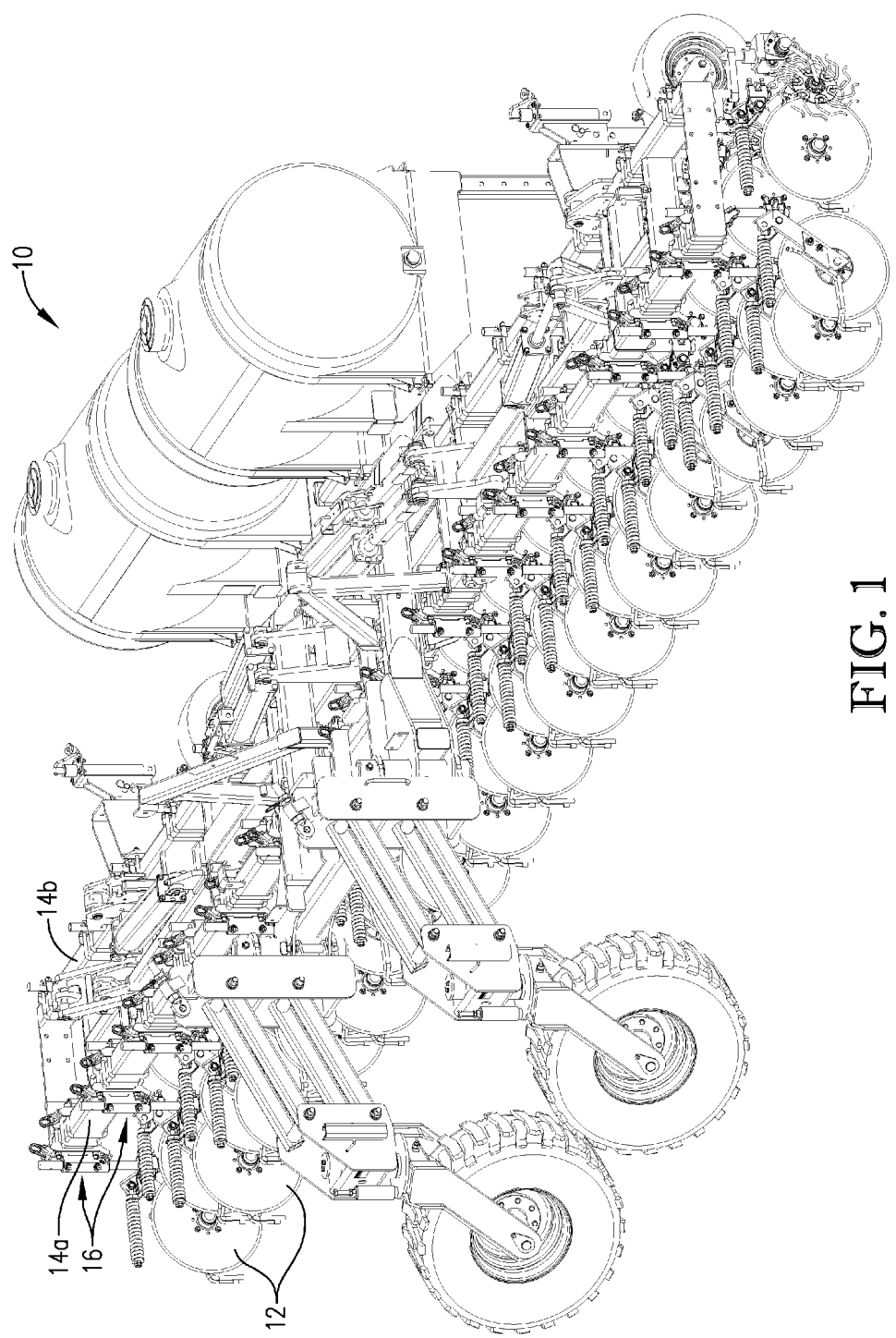
FIG. 1 is a perspective view of an agricultural implement in accordance with one embodiment of the present invention, particularly showing a plurality of tool support systems each mounted onto one of two transverse support bars, with each tool support system supporting an agricultural tool.

FIG. 1 depicts an agricultural implement 10 in accordance with one embodiment of the present invention. The agricultural implement 10 of FIG. 1 can include a plurality of individual tool support systems 16 connected to one of the transverse support bars 14a and 14b, with each tool support system 16 supporting an agricultural tool 12. The agricultural implement 10 of FIG. 1 can be any type of implement, and a particular implement can be chosen by one skilled in the art for a particular purpose. A non-limiting list of agricultural implements 10 that may be used in accordance with the present invention includes fertilizer applicators, sprayers, drills, and planters.

The type of agricultural tool employed in the present invention can vary depending on the specific type of agricultural implement used. For example, in the embodiment depicted in the drawings, the agricultural tool 12 is a coulter. However, it should be noted that the present invention can also be applied to other ground-engaging agricultural tools such as, for example, closers, row cleaners, and plow shanks. In addition, agricultural tools that do not engage the ground can be employed. One example of such a non-ground-engaging agricultural tool suitable for use in conjunction with the present invention is a crop shield that is installed on a sprayer to prevent drift for smaller plants, but can be removed when treating larger plants.

In the embodiment depicted in FIG. 1, the implement 10 can have two transverse support bars, 14a and 14b. In various embodiments not depicted in the figures, the implement 10 can have at least one, two, three, four, or more transverse support bars. In certain embodiments, the transverse support bars 14a and 14b can have a rectangular cross-sectional shape. In one or more embodiments, the transverse support bars 14a and 14b can have another polygonal cross-sectional shape, or may have a cylindrical cross-sectional shape.

Figure 2:
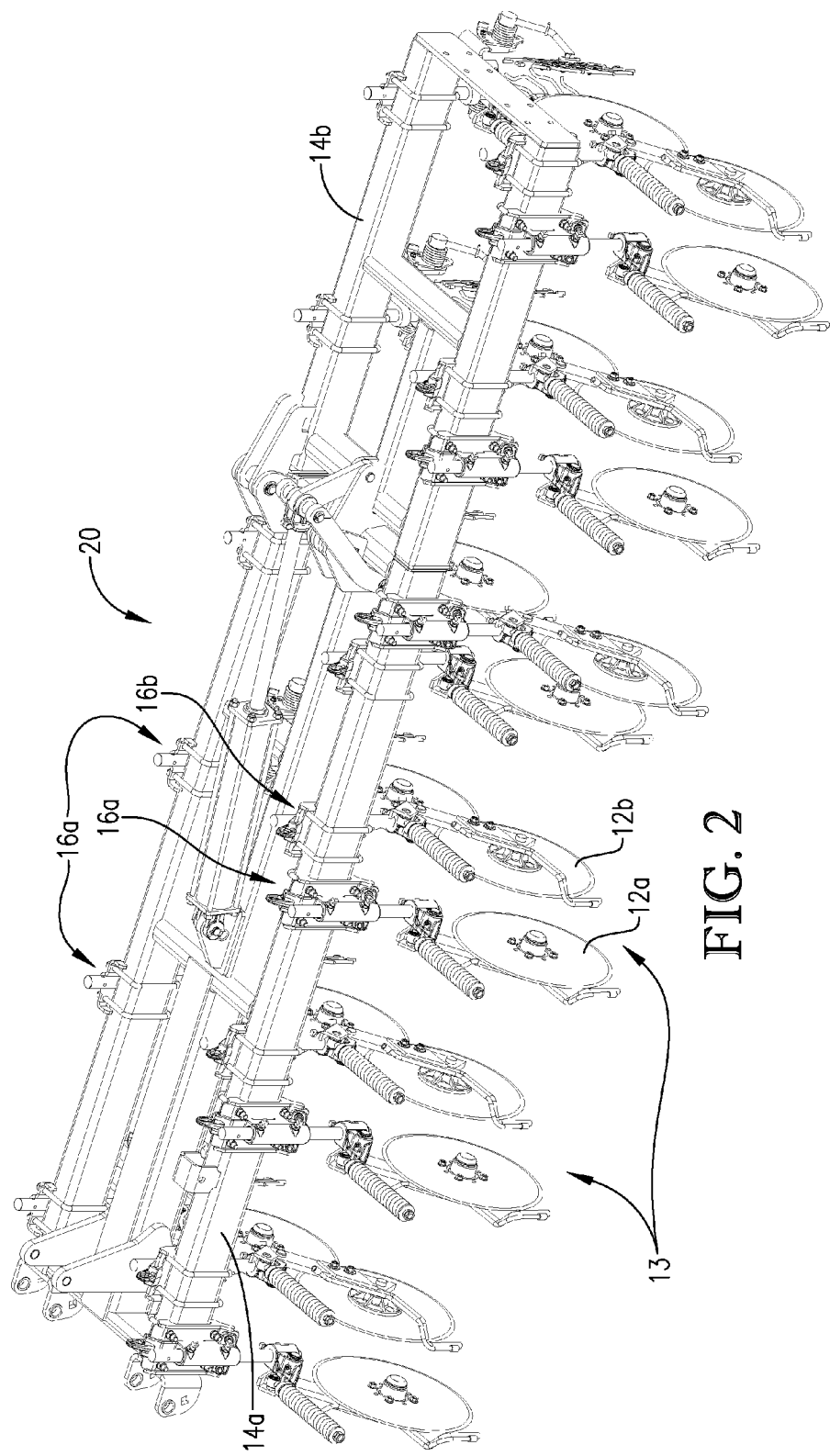
FIG. 2 is a perspective view of a portion of the agricultural implement of FIG. 1, particularly showing the spacing and arrangement of the tool support systems mounted on the transverse support bars.

FIG. 2 depicts a portion 20 of the implement 10 having a first tool support system 16a that can mount a first agricultural tool 12a onto the transverse support bar 14a, while a second tool support system 16b can mount a second agricultural tool 12b onto the transverse support bar 14a. The tool support systems 16a and 16b can be positioned at any location or in any pattern along the transverse support bars 14a and 14b, and a particular pattern and/or spacing can be determined by one skilled in the art for a specific purpose. For example, in the embodiment depicted in FIG. 2, on the rear transverse support bar 14a, a group 13 of two closely positioned tool support systems 16a and 16b can be equally spaced apart from another group 13 having the same configuration, while on the front transverse support bar 14b, individual tool support systems 16a can be roughly equidistant from one another at positions that roughly align with the groups 13 on the rear transverse support bar 14a.

A first and second tool support system 16a and 16b will now be described in detail with reference to FIGS. 3-5. Although the following description may reference only one tool support system 16a or 16b, or portions thereof, it should be understood that any or all of the following description referencing one of the tool support systems 16a or 16b, or portions thereof, may, in certain embodiments, also apply to the other tool support system 16a or 16b not specifically referenced. A reference to a portion of the first tool support system 16a will be denoted with an "a" after the number, while a reference to a portion of the second tool support system 16b will be denoted with a "b" after the number.

Figure 3:
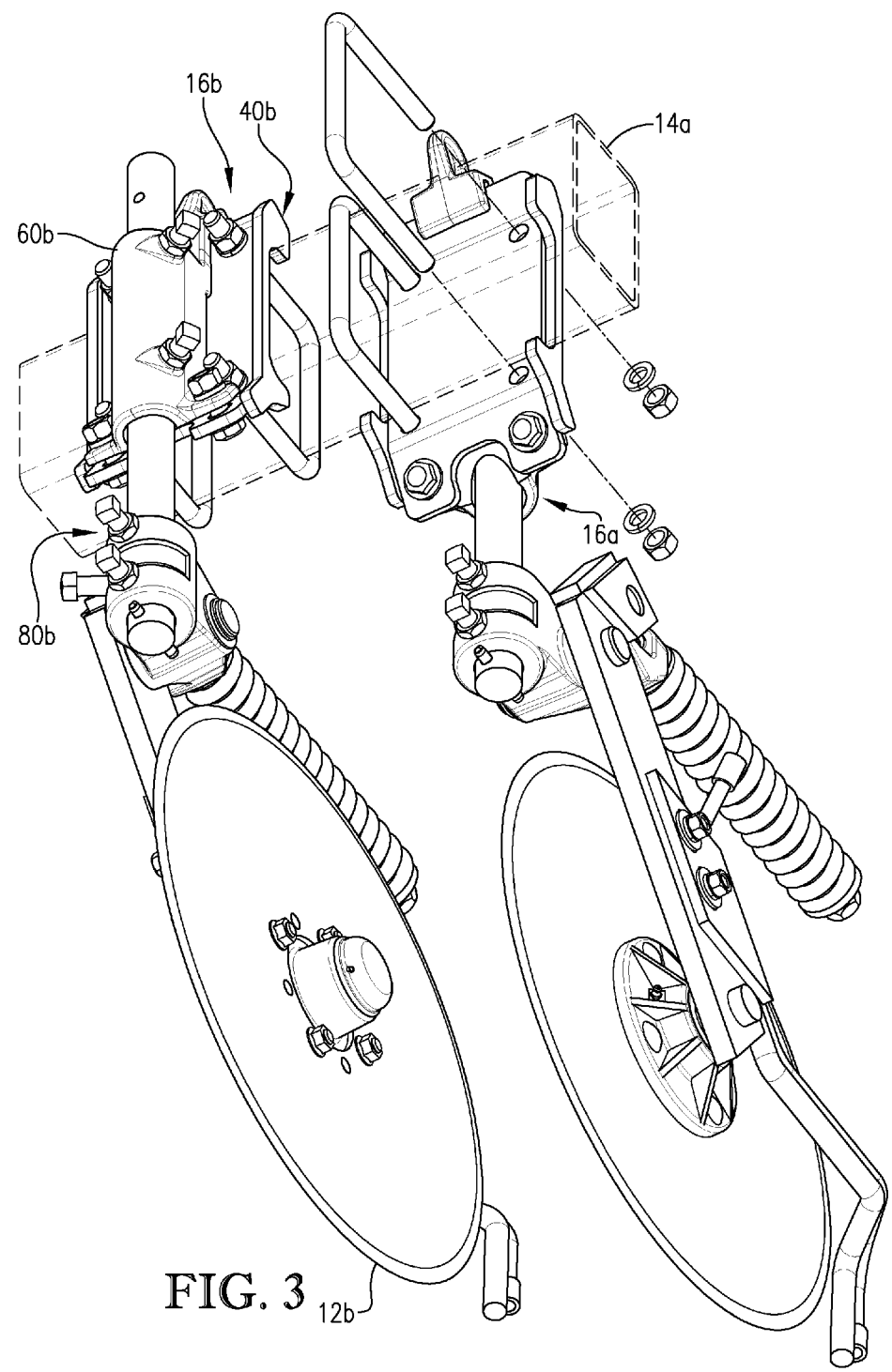
FIG. 3 is a bottom perspective and exploded view of a first and second tool support system, particularly illustrating the tool support systems mounted onto a transverse support bar in an opposing orientation, with each tool support system having a lateral positioning structure, a detachable base, and a tool support assembly supporting an agricultural tool.

As depicted in FIG. 3, the tool support system 16b may include a lateral positioning structure 40b, a detachable base 60b, and a tool support assembly 80b, which can cooperatively serve to mount the agricultural tool 12b on the transverse support bar 14a. The lateral positioning structure 40b can be attached to the transverse support bar 14a, while the detachable base 60b can be coupled to the lateral positioning structure 40b, and coupled to the tool support assembly 80b, which can support the ground engagement tool 12b.

Figure 4:
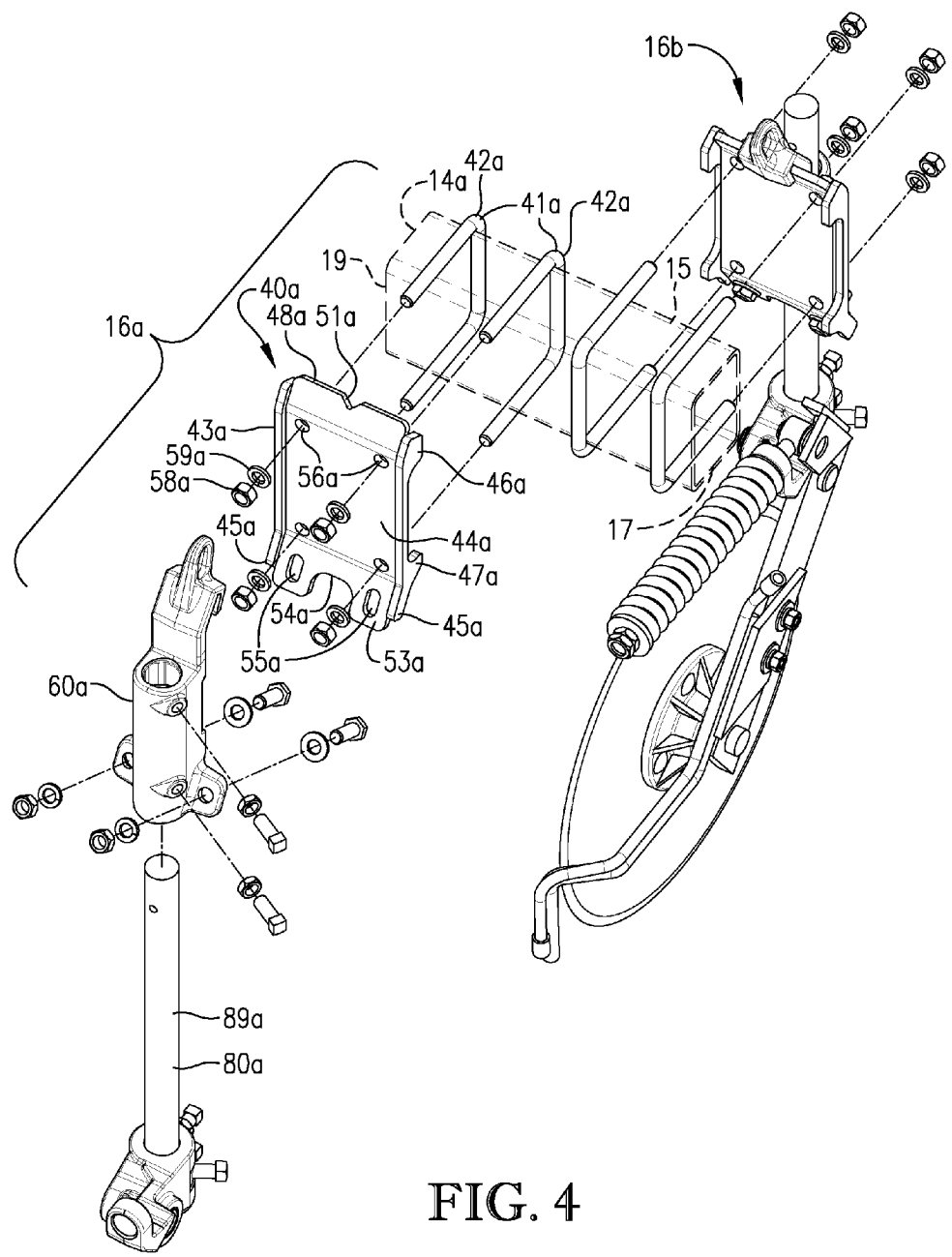
FIG. 4 is a top perspective and exploded view of the tool support systems of FIG. 3, particularly illustrating the engagement between the transverse support bar and the tool support systems, with each tool support system having a lateral positioning structure attached to the transverse support bar and a detachable base coupled to the lateral positioning structure.

Referring now to FIG. 4, the lateral positioning structure 40a can be configured to attach to the transverse support bar 14a in any manner known to one skilled in the art. For example, the lateral positioning structure 40a may include a support engagement member 41a configured to secure the lateral positioning structure 40a to the transverse support bar 14a. As shown in FIG. 4, the support engagement member 41a can include two U-bolts 42a that extend around the transverse support bar 14a and are secured to a portion of the lateral positioning structure 40a, thereby semi-permanently attaching the lateral positioning structure 40a to the transverse support bar 14a. In other embodiments, the lateral positioning structure 40a can be configured for permanent attachment to the transverse support bar 14a via a permanent attachment technique, such as, for example, welding.

In the embodiment depicted in FIG. 4, the lateral positioning structure 40a can include a support engagement member 43a that can engage both the detachable base 60a and the transverse support bar 14a. As depicted in FIG. 4, the support engagement member 43a may include a roughly flat member 44a positioned between two side members 45a. Each side member 45a can include an upper protrusion 46a and/or a lower protrusion 47a that can extend outward from the flat member 44a.

In certain embodiments, when the lateral positioning structure 40a is secured to the transverse support bar 14a, the flat member 44a can contact the side surface 19 of the transverse support bar 14a, while the protrusions 46a and 47a can contact the top surface 15 and bottom surface 17, respectively, of the transverse support bar 14a. Further, in certain embodiments, where the lateral positioning structure 40a is secured to the transverse support bar 14a, the flat member 44a can be secured to the bar attachment member 41a. For example, in certain embodiments, the flat member 44a can include voids 56a for receiving a portion of the bar attachment member 41a to be secured thereto. In such embodiments, at least a portion of the bar attachment member 41a can extend through the voids 56a and may be secured in place by nuts 58a and washers 59a.

In certain embodiments, the lateral positioning structure 40a can include an upper projection 48a for engagement with the detachable base 60a. As depicted in FIG. 4, the upper projection 48a may include a lateral alignment recess 51a to facilitate secure engagement with the detachable base 60a. The upper projection 48a can extend out and at an angle relative to the plane of the flat member 44a. As depicted in FIG. 4, the lateral positioning structure 40a may also include a lower projection 53a that can engage with the detachable base 60a. The lower projection 53a can extend out and at an angle relative to the flat member 44a. The lower projection 53a can include a recess 54a to accommodate a portion 89a of the tool support assembly 80a when the detachable base 60a connects the tool support assembly 80a to the lateral positioning structure 40a. The lower projection 53a can include openings 55a configured to secure at least a portion of the detachable base 60a thereto, as further discussed below.

Figures 5, 6:
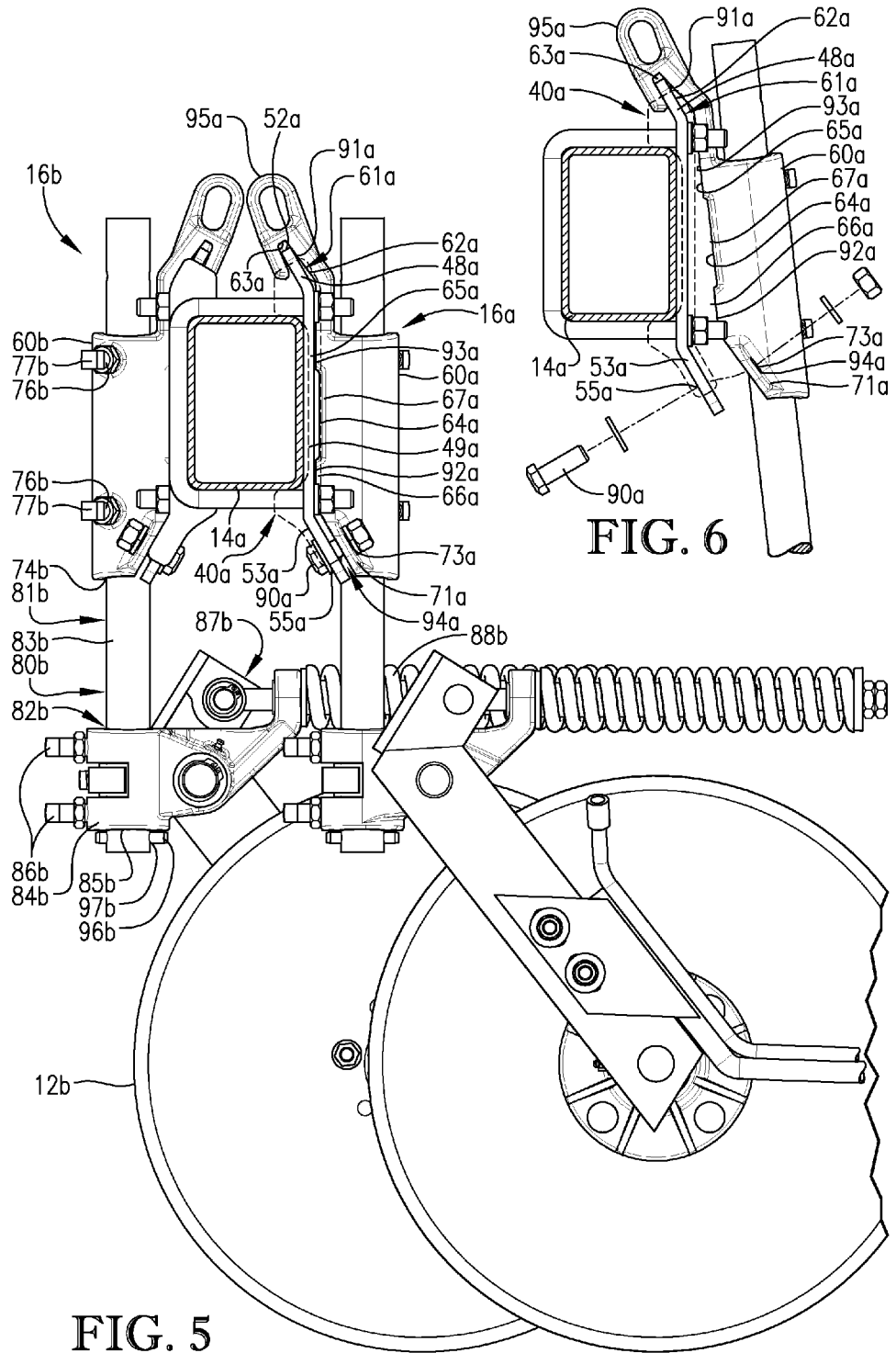
FIG. 5 is a side view of the tool support systems of FIG. 3, particularly illustrating an upper projection of a lateral positioning structure partly received inside an upper recess of a detachable base, and base connectors securing a lower projection of the lateral positioning structure to the side projections of the detachable base.
FIG. 6 is an enlarged side view of a portion of the first tool support system of FIG. 3, particularly illustrating an upper projection of a lateral positioning structure partly received inside an upper recess of a detachable base, with a lower contact surface of the lateral positioning structure spaced apart from a lower engagement surface of the detachable base.

Referring now to FIGS. 5 and 6, in certain embodiments, the detachable base 60a can include an upper recess 61a for engagement with the lateral positioning structure 40a. As shown in FIGS. 5 and 6, the upper recess 61a can taper from a broad opening width at the recess opening 62a to a narrow closed end width at the recess closed end 63a. The upper recess 61a can be any suitable width, as long as at least a portion of the lateral positioning structure 40a can be received inside the upper recess 61a of the detachable base 60a.

As depicted in FIGS. 5 and 6, the detachable base 60a may present a lower engagement surface 64a that can engage the lateral positioning structure 40a. The engagement surface 64a can include a recess 67a positioned between an upper engagement surface 65a and a lower engagement surface 66a. In various embodiments not depicted in the figures, the engagement surface 64a does not include a recess 67a and is substantially flat. In certain other embodiments, the engagement surface 64a can be any shape as long as it can engage at least a portion of the lateral positioning structure 40a. The detachable base 60a may include side projections 71a for engaging the lateral positioning structure 40a. The detachable base 60a can include at least two side projections 71a that extend out from the detachable base 60a in opposing directions.

In certain embodiments, the tool support system 16a can include a lifting aid attachment member 95a to aid in engaging or disengaging the tool support system 16a with the transverse support bar 14a. In the embodiment depicted in FIG. 5, the lifting aid attachment member 95a can be in the shape of a loop that is located above the upper recess 61a of the detachable base 60a. In certain embodiments, the lifting aid attachment member 95a can be any shape or size as long as it can aid in lifting the tool support system 16a.

Referring now to FIG. 5, in certain embodiments, the tool support system 16b may include a tool support assembly 80b that can support an agricultural tool 12b. The tool support assembly 80b may include a first portion 81b and a second portion 82b. In certain embodiments, the first portion 81b of the tool support assembly 80b can be any article that is capable of engaging both the detachable base 60b and the second portion 82b of the tool support assembly 80b. The first portion 81b can include a rigid member 83b, such as, for example, a metal bar or rod. The second portion 82b of the tool support assembly 80b can include an attachment device 84b for engaging the first portion 81b of the tool support assembly 80b. The attachment device 84b can be configured to fixedly or removably couple the second portion 82b to the first portion 81b. In the embodiment depicted in FIG. 5, the attachment device 84b can define an opening 85b for receiving at least a portion of the first portion 81b of the tool support assembly 80b. In addition, the attachment device 84b may include fasteners 86b for securing at least a portion the first portion 81b inside the opening 85b. The attachment device 84b can be any device or mechanism for coupling the first portion 81b to the second portion 82b, and a specific device can be chosen by one skilled in the art for a particular purpose.

As depicted in FIGS. 5 and 6, the tool support assembly 80b may include a pin 96b received inside a void 97b in the first portion 81b to at least partially prevent downward vertical movement of the second portion 82b relative to the first portion 81b. In certain embodiments not depicted in the figures, the first portion 81b and the second portion 82b of the tool support assembly 80b can be one integral member. For example, in such embodiments, the one integral member can both engage the detachable base 60b and support the agricultural tool 12b.

To reduce the shock associated with traversing agricultural terrain, the tool support system 16b may include a shock absorbing mechanism 87b. For example, in the embodiment depicted in FIG. 5, the second portion 82b of the tool support assembly 80b can include a shock absorbing mechanism 87b. The shock absorbing mechanism 87b can be configured to permit movement of the agricultural tool 12b relative to the rigid member 83b when the agricultural tool 12b is impacted by an external force. In the embodiment depicted in FIG. 5, the shock absorbing mechanism 87b may include a spring 88b. The shock absorbing mechanism 87b can include any mechanism or device known to one skilled in the art as long as it is able to absorb a portion of an external force applied to the agricultural tool 12b and/or permit movement of the agricultural tool 12b relative to the rigid member 83b when the agricultural tool 12b is impacted by an external force.

In one or more embodiments, the tool support system 16b may include a mechanism for adjusting and maintaining the vertical position of the ground engagement tool 12b relative to the detachable base 60b. For example, in the embodiment depicted in FIG. 5, the tool support system 16b can include a vertical position adjustment mechanism 76b configured to at least partially control shifting of the tool support assembly 80b, which is supporting the agricultural tool 12b, relative to the detachable base 60b.

In certain embodiments, the vertical position adjustment mechanism 76b may be shiftable between a released configuration and a fixed configuration. When the vertical position adjustment mechanism 76b is in the released configuration, the first portion 81b of the tool support assembly 80b is shiftable relative to the detachable base 60b, thereby allowing the tool support assembly 80b to be removed from the detachable base 60b, and/or allowing the agricultural tool 12b to be shifted to a desired vertical position relative to the detachable base 60b. When the vertical position adjustment mechanism 76b is in the fixed configuration, the first portion 81b of the tool support assembly 80b is fixed relative to the detachable base 60b, thereby fixing the vertical position of the agricultural tool 12b relative to the detachable base 60b.

The vertical position adjustment mechanism 76b can be any mechanism to adjust and maintain the position of the agricultural tool 12b relative to the detachable base 60b, and a particular mechanism or device can be chosen by one skilled in the art for a specific purpose. In certain embodiments, the vertical position adjustment mechanism 76b can include any bolt or fastener configured to fix the position of the tool support assembly 80b relative to the detachable base 60b. For example, in the embodiment depicted in FIG. 5, the vertical position adjustment mechanism 76b may include at least one bolt 77b configured to exert a lateral holding force on the first portion 81b of the tool support assembly 80b when the vertical position adjustment mechanism 76b is in the fixed configuration. Further, in such embodiments, when the vertical position adjustment mechanism 76b is in the released configuration, the bolts 77b can be positioned to allow the first portion 81b to shift relative to the detachable base 60b. As discussed in detail below, in certain embodiments, the vertical position adjustment mechanism 76b can include a bolt 77b that can extend through the detachable base 60b and engage the first portion 81b of the tool support assembly 80b that is located inside an opening 74b of the detachable base 60b.

The engagement of the detachable base 60a to the lateral positioning structure 40a will now be described in detail with reference to FIGS. 5 and 6. When the detachable base 60a is coupled to the lateral positioning structure 40a, the base 60a and the lateral positioning structure 40a may contact one another at two vertically spaced apart contact locations, such as, for example, an upper contact location 91a and lower contact location 92a. In certain embodiments, the contact locations 91a and 92a can be vertically spaced apart from one another by at least 1, 2, 4, or 6 inches. In one or more embodiments, the detachable base 60a and the lateral positioning structure 40a may contact each other at three spaced apart locations, such as, for example, the contact locations 91a and 92a, and a middle contact location 93a.

In one or more embodiments, at the upper contact location 91a, the upper projection 48a of the lateral positioning structure 40a can be at least partly received inside the upper recess 61a of the detachable base 60a. As seen in FIG. 5, in certain embodiments, the terminal end 52a of the upper projection 48a has a thickness that is between the broad opening width of the recess opening 62a and the narrow closed end width of the recess closed end 63a. The upper projection 48a and the upper recess 61a can be any size and shape as long as the lateral positioning structure 40a and the detachable base 60a are able to engage one another at the upper contact location 91a.

As seen in FIG. 5, when the detachable base 60a is coupled to the lateral positioning structure 40a, the lower engagement surface 64a of the detachable base 60a can engage the lower contact surface 49a of the lateral positioning structure 40a, thereby creating the lower contact location 92a and the middle contact location 93a. At the lower contact location 92a, the lower engagement surface 66a of the detachable base 60a may engage the lower contact surface 49a of the lateral positioning structure 40a, and, at the middle contact location 93a, the upper engagement surface 65a of the detachable base 60a may engage the lower contact surface 49a of the lateral positioning structure 40a.

In certain embodiments, the tool support system 16a may include base connectors 90a for releasably coupling the detachable base 60a to the lateral positioning structure 40a. When the detachable base 60a is coupled to the lateral positioning structure 40a, the base connectors 90a may connect the detachable base 60a and the lateral positioning structure 40a at a connection location 94a that is spaced apart from the upper and lower contact locations, 91a and 92a, respectively. The connection location 94a can be positioned at any location relative to the contact locations 91a and 92a. In certain embodiments, the connection location 94a can be positioned between the contact locations 91a and 92a. In one or more embodiments, the connection location 94a can be positioned above or below both of the contact locations 91a and 92a.

In the embodiment depicted in FIGS. 5 and 6, the base connectors 90a can connect the detachable base 60a and the lateral positioning structure 40a at a connection location 94a that is located below both contact locations 91a and 92a. At the connection location 94a of FIGS. 5 and 6, the side protrusions 71a of the detachable base 60a can contact the lower projection 53a of the lateral positioning structure 40a. In such embodiments, an opening 73a of the side projections 71a may align with an opening 55a of the lower projection 53a to receive a base connector 90a, thereby connecting the detachable base 60a to the lateral positioning structure 40a.

The openings 55a and 73a can be on any other portion of the lateral positioning structure 40a and the detachable base 60a, respectively, as long as the openings 55a and 73a can align to receive the base connectors 90a. In an embodiment not depicted in the figures, the openings 55a can be located on the flat member 44a of the lateral positioning structure 40a, which may align with the openings 73a on the side projections 71a.

The base connectors 90a can be any connector that is capable of coupling the detachable base 60a to the lateral positioning structure 40a, and a specific type of connector can be chosen by one skilled in the art. For example, in various embodiments, the base connectors 90a can include one or more bolts, screws, or pins. In certain embodiments, the base connectors 90a may include at least one, two, three, or four bolts.

In certain embodiments, the base connectors 90a can be shiftable between a connection configuration where the base connectors 90a rigidly couple the detachable base 60a to the lateral positioning structure 40a, and a disconnected configuration where the base connectors 90a permit removal of the detachable base 60a from the lateral positioning structure 40a. For example, in the embodiment depicted in FIG. 5, the base connectors 90a can be inserted into the openings 55a of the lateral positioning structure 40a and through the aligned openings 73a of the side projections 71a and secured, thereby rigidly coupling the detachable base 60a to the lateral positioning structure 40a. Further, in certain embodiments, when the base connectors 90a are disconnected and not utilized to secure the detachable base 60a to the lateral positioning structure 40a, the detachable base 60a can be removed from the lateral positioning structure 40a by lifting the detachable base 60a upward and away from the lateral positioning structure 40a.

In various embodiments, the detachable base 60a, the lateral positioning structure 40a, and the base connectors 90a are configured to securely connect the detachable base 60a to the lateral positioning structure 40a. For example, in one or more embodiments, the detachable base 60a and the lateral positioning structure 40a are configured such that a holding force supplied by the base connectors 90a forces the upper projection 48a of the lateral positioning structure 40a further into the upper recess 61a of the detachable base 60a. As best seen in FIG. 6, when the upper projection 48a is received inside the upper recess 61a, the lateral positioning structure 40a and the detachable base 60a are spaced apart from one another at the connection location 94a, so that by securing the lateral positioning structure 40a to the detachable base 60a at the connection location 94a, the upper projection 48a is further forced into the upper recess 61a of the detachable base 60a. Additionally, or alternatively, the detachable base 60a and the lateral positioning structure 40a can be spaced apart from one another at the connection location 94a so that tightening of the base connectors 90a increases the force exerted at the upper and lower contact locations 91a and 92a, respectively, and increases a bending moment in the detachable base 60a and/or the lateral positioning structure 40a.

Figures 7, 8:
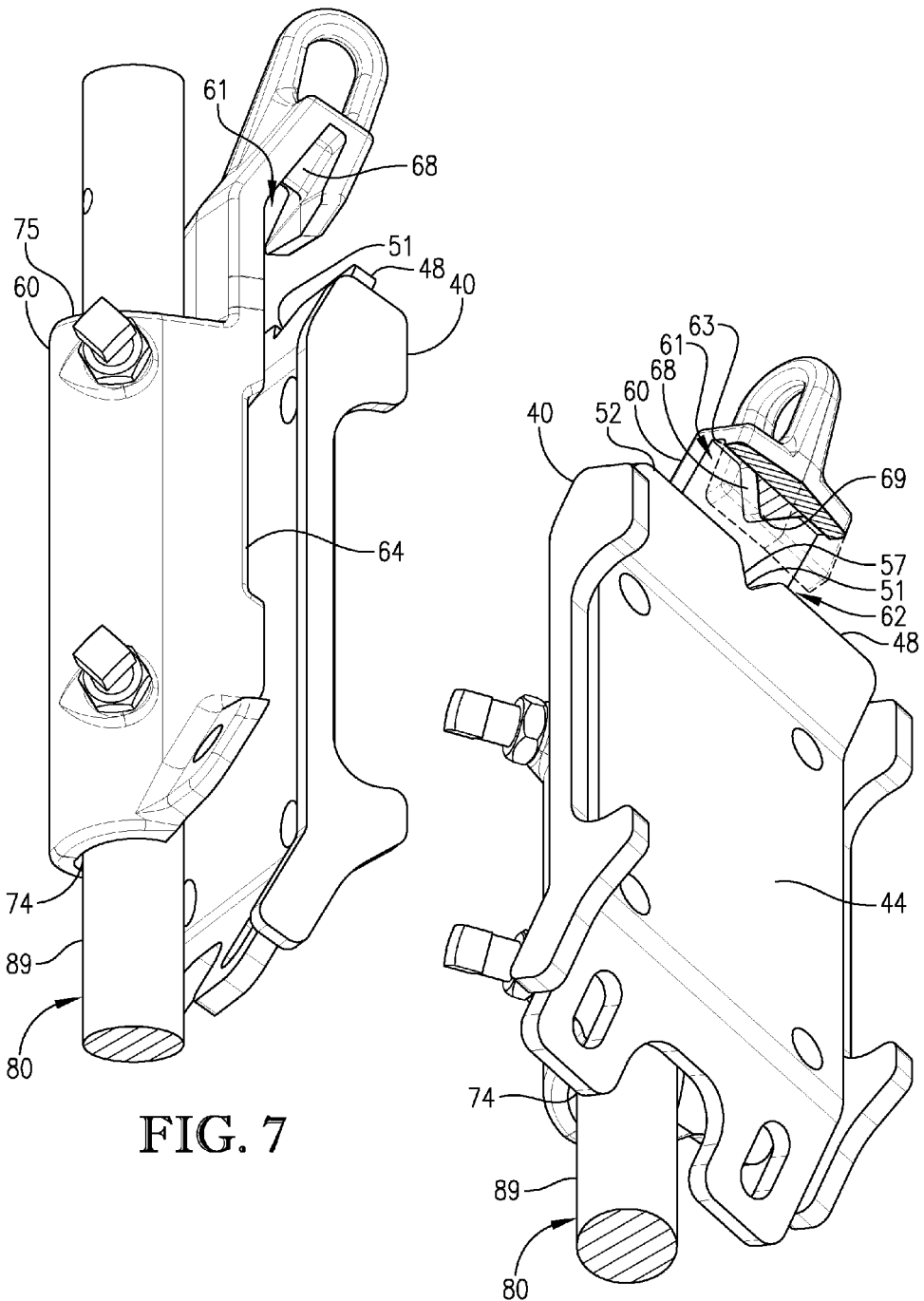
FIG. 7 is a bottom perspective view of a detachable base and lateral positioning structure in accordance with one embodiment of the present invention, particularly illustrating an alignment protrusion positioned in the upper recess of the detachable base, and an alignment recess positioned in the upper projection of the lateral positioning structure.
FIG. 8 is a bottom perspective view of the detachable base and lateral positioning structure of FIG. 7, particularly illustrating the complimentary shapes of the lateral alignment protrusion of the detachable base and the lateral alignment recess of the lateral positioning structure, and further illustrating a first portion of a tool support assembly partly received inside a recess of the lower projection of the lateral positioning structure.

Referring now to FIGS. 7 and 8, in certain embodiments, the detachable base 60 and/or the lateral positioning structure 40 may include complimentary structural features to facilitate engagement between them. For example, in certain embodiments, one of the detachable base 60 and the lateral positioning structure 40 may present a lateral alignment protrusion 68 and the other of the detachable base 60 and the lateral positioning structure 40 may present a lateral alignment recess 51, so that when the detachable base 60 is coupled to the lateral positioning structure 40, the lateral alignment protrusion 68 is received in the lateral alignment recess 51. In certain embodiments, the lateral alignment protrusion 68 and the lateral alignment recess 51 can cooperate to couple the detachable base 60 to the lateral positioning structure 40 at a specific lateral position along the lateral positioning structure 40.

In the embodiment depicted in FIGS. 7 and 8, the detachable base 60 may present the lateral alignment protrusion 68 and the lateral positioning structure 40 may present the lateral alignment recess 51. In certain embodiments, the lateral alignment recess 51 can be positioned in the upper projection 48 of the lateral positioning structure 40. For example, as seen in FIG. 8, the lateral alignment recess 51 may present a tapered surface 57 having a broad opening at the terminal end 52 of the upper projection 48 that narrows as it extends into the upper projection 48. In certain embodiments not depicted in the figures, the lateral alignment recess 51 can be located in the flat member 44 of the lateral positioning structure 40. In one or more embodiments, the lateral alignment protrusion 68 may be positioned inside the upper recess 61 of the detachable base 60. For example, as best seen in FIG. 8, the lateral alignment protrusion 68 extends from the recess closed end 63 and tapers to an end 69 towards the recess opening 62. The lateral alignment protrusion 68 and the lateral alignment recess 51 can be any shape and size as long as the lateral alignment protrusion 68 and the lateral alignment recess 51 are roughly complimentary in shape and size, and do not inhibit the engagement between the lateral positioning structure 40 and the detachable base 60.

Referring now to FIGS. 7-11, the engagement between the detachable base 60 and the tool support assembly 80 will now be described in detail. In certain embodiments, the detachable base 60 can define an opening 74 for engagement with the tool support assembly 80. For example, as seen in FIG. 7, the detachable base 60 may include an opening 74 that is positioned opposite the engagement surface 64, with the top end 75 of the opening 74 positioned below the upper recess 61. In one or more embodiments, the opening 74 can be in any location on the detachable base 60 relative to the engagement surface 64 and the upper recess 61, such as, for example, the top end 75 of the opening 74 can be positioned above the upper recess 61.

In the embodiment depicted in FIGS. 7-8, a portion 89 of the tool support assembly 80 may be at least partially received inside the opening 74 of the detachable base 60. The portion 89 of the tool support assembly 80 can be cylindrical in shape, and the opening 74 of the detachable base 60 may have a substantially circular cross section to accommodate the cylindrical portion 89 of the tool support assembly 80.

Figure 9:
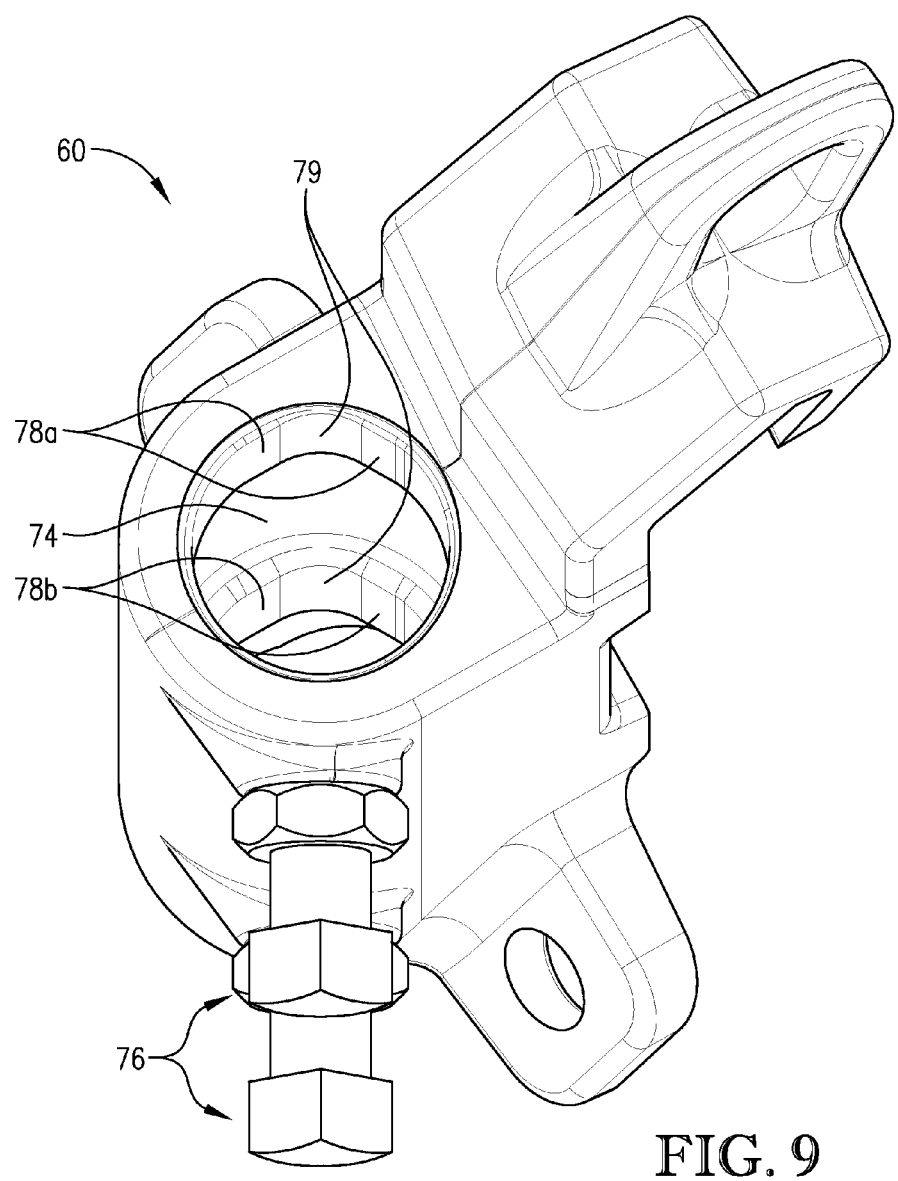
FIG. 9 is a top perspective view of a detachable base in accordance with another embodiment of the present invention, particularly illustrating an opening having angled engagement surfaces located therein, and further illustrating a vertical position adjustment mechanism that includes two bolts.
Figure 10:
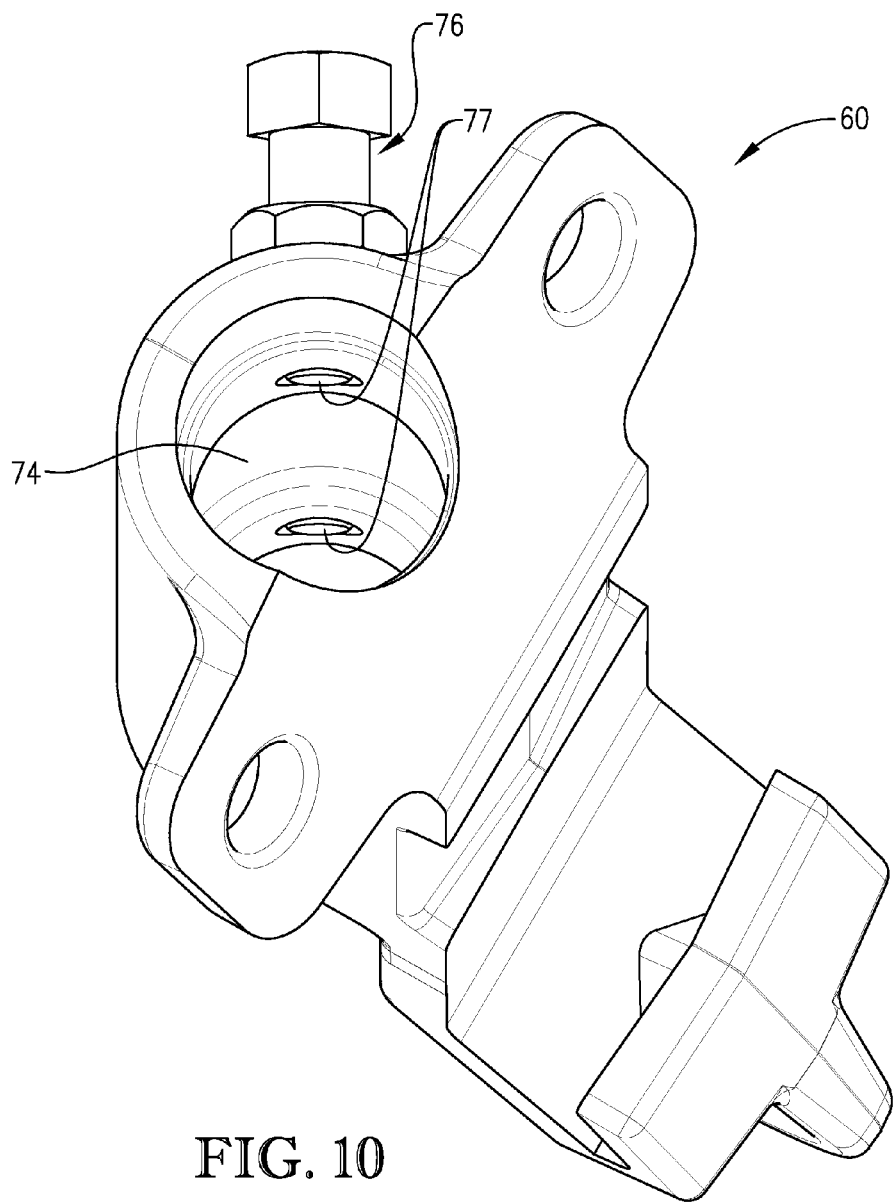
FIG. 10 is a bottom perspective view of the detachable base of FIG. 9, particularly illustrating the alignment between the vertical position adjustment mechanism and the angled engagement surfaces of the detachable base.
Figure 11:
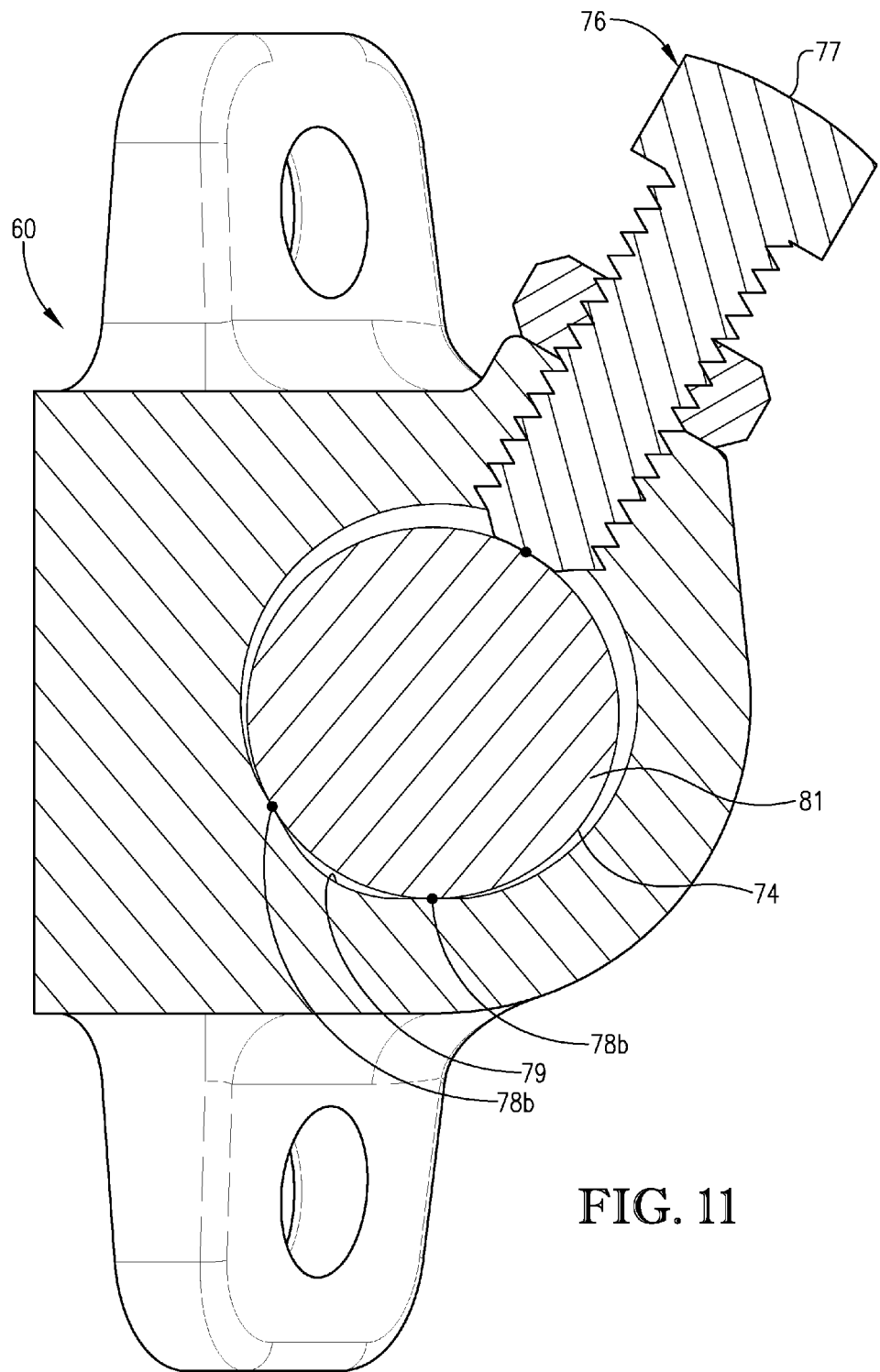
FIG. 11 is a cross-sectional view of a detachable base and a first portion of a tool support assembly in accordance with yet another embodiment of the present invention, particularly illustrating a bolt of a vertical position adjustment mechanism engaging the first portion of the tool support assembly inside the opening of the detachable base, and further illustrating a noncircular portion of the opening opposite the bolt.

Referring now to FIGS. 9-11, in certain embodiments, the opening 74 of the detachable base 60 may present at least two, three, four, or more engagement surfaces 78 for engaging a portion 89, e.g., the received portion 81, of the tool support assembly 80. For example, as depicted in FIG. 9, the opening 74 may present an upper pair of angled engagement surfaces 78a and a lower pair of angled engagement surfaces 78b.

As perhaps best shown in FIG. 11, the cross section of the opening 74 can be mostly circular, with a non-circular portion 79 located generally opposite each bolt 77 of the vertical position adjustment mechanism 76. The engagement surfaces 78 can be defined by this non-circular portion 79 of the opening 74. In this configuration, when the bolts 77 of the vertical position adjustment mechanism 76 are tightened, the received portion 81 of the tool support assembly 80 is forced against the engagement surfaces 78 located opposite the bolts 77. Therefore, when the vertical position adjustment mechanism 76 is in the fixed configuration (with the bolts 77 tightened), the received portion 81 of the tool support assembly 80 is rigidly secured in the opening 74 at three circumferentially-spaced contact locations (i.e., the location where the bolt 77 contacts the received portion 81 and the two locations where the received portion 81 contacts the engagement surfaces 78).

Certain embodiments of the agricultural implement described herein can permit agricultural tools to be readily detached and re-attached at predetermined locations along the length of the transverse support bars. Referring back to FIGS. 1-5, for various reasons, it may be desirable to operate the agricultural implement 10 without all or part of the agricultural tools 12. The achieve this, the operator of the implement 10 can simply remove one or more of the agricultural tools 12 by detaching one or more of the tool support systems 16 from one or more of the lateral positioning structures 40 in the manner described above. Since the lateral positioning structures 40 remain fixed to the transverse support bars 14 after removal of the tool support systems 16, all or part of the removed agricultural tools 12 can be readily re-attached to the transverse support bars 14 by reconnecting the tool support systems 16 to the lateral positioning structures 40 in the manner described above. This ability to readily detach and re-attach one or more of the agricultural tools 12 make the implement more versatile and/or more easy to operate.

In addition, as discussed above, in certain embodiments, the operator of the implement can readily adjust and/or fix the vertical height of the agricultural tools by loosening a vertical position adjustment mechanism and by extending or retracting an elongated rigid member of the tool support assembly relative to the detachable base in the manner described above. This vertical adjustment feature also adds to the versatility and/or ease of operation of the implement.

It is the inventor's intent to rely on the Doctrine of Equivalents to determine and assess the reasonably fair scope of the present invention as it pertains to any methods and systems not materially departing from but outside the literal scope of the invention as set forth in the following claims.

What is claimed is:

1. An agricultural implement tool support system for mounting a plurality of agricultural tools on a transverse support bar of an agricultural implement, said tool support system comprising:
   a lateral positioning structure configured for rigid attachment to said transverse support bar along the length of said transverse support bar;
   a detachable base removably coupled to said lateral positioning structure; and
   a vertically-adjustable support assembly having a first portion shiftably coupled to said detachable base and a second portion configured for supporting an agricultural tool, wherein the position of said vertically-adjustable support assembly relative to said detachable base is adjustable and fixable so as to set a desired vertical position for said agricultural tool, wherein said positioning structure comprises an upper projection and a lower contact surface, wherein said detachable base comprises an upper recess and a lower engagement surface, wherein when said detachable base is coupled to said positioning structure said upper projection is at least partially received in said upper recess and said lower engagement surface engages said lower contact surface.

2. The system according to claim 1, further comprising one or more base connectors for maintaining engagement between said lower engagement surface and said lower contact surface.

3. The system according to claim 2, wherein said base connectors are positioned below said engagement and contact surfaces.

4. The system according to claim 2, wherein said base connectors comprises one or more bolts.

5. The system according to claim 1, wherein said lateral positioning structure is configured for (i) semi-permanent attachment to said transverse support bar via bolts or (ii) permanent attachment to said transverse support bar via welding.

6. The system according to claim 1, wherein said first portion of said support assembly comprises a rigid member, wherein said second portion of said support assembly comprises a shock absorbing mechanism, wherein said shock absorbing mechanism is configured to permit movement of said agricultural tool relative to said rigid member when said agricultural tool is impacted by an external force.

7. The system according to claim 1, wherein said agricultural tool comprises a coulter, a closer, a row cleaner, a plow shank, or a crop shield.

8. The system according to claim 1, further comprising a vertical position adjustment mechanism configured to at least partially control shifting of said first portion of said support assembly relative to said detachable base.

9. The system according to claim 8, wherein said vertical position adjustment mechanism is shiftable between a released configuration and a fixed configuration, wherein when said vertical position adjustment mechanism is in said released configuration said first portion of said support assembly is shiftable relative to said detachable base, wherein when said vertical position adjustment mechanism is in said fixed configuration said first portion of said support assembly is fixed relative to said detachable base, wherein said vertical position adjustment comprises at least one bolt configured to exert a lateral holding force on said first portion of said support assembly when said vertical position adjustment mechanism is in said fixed configuration.

10. The system according to claim 9, wherein said detachable base defines an opening receiving at least part of said first portion of said support assembly, wherein said bolt extends through said detachable base, into said opening, and into engagement with said first portion of said support assembly, wherein said opening presents a pair of angled engagement surfaces, wherein said bolt forces said first portion of said support assembly into engagement with said engagement surfaces when said vertical position adjustment mechanism is in said fixed configuration, wherein said opening has a non-circular cross-section to thereby provide said engagement surfaces.

11. The system according to claim 1, further comprising one or more base connectors for releasably coupling said detachable base to said lateral positioning structure.

12. The system according to claim 11, wherein when said detachable base is coupled to said lateral positioning structure said detachable base and said lateral positioning structure contact one another at two vertically spaced apart contact locations, wherein when said detachable base is coupled to said lateral positioning structure said base connectors connect said detachable base and said lateral positioning structure at a connection location that is spaced from said contact locations.

13. The system according to claim 12, wherein said detachable base and said lateral positioning structure are spaced from one another at said connection location so that tightening of said base connectors increases the force exerted at said contact locations and increases a bending moment in said detachable base and/or said positioning structure.

14. The system according to claim 11, wherein said base connectors are shiftable between a connected configuration where said base connectors rigidly couple said detachable base to said positioning structure and a disconnected configuration where said base connectors permit removal of said detachable base from said positioning structure.

15. A tool support system for mounting a plurality of agricultural tools on a transverse support bar of an agricultural implement, said tool support system comprising:
    a lateral positioning structure configured for rigid attachment to said transverse support bar along the length of said transverse support bar, wherein said lateral positioning structure comprises an upper projection and a lower contact surface;
    a detachable base removably coupled to said lateral positioning structure, wherein said detachable base comprises an upper recess and a lower engagement surface;
    one or more releasable connectors for removably coupling said detachable base to said lateral positioning structure, wherein when said detachable based is coupled to said lateral positioning structure said upper projection is received in said upper recess and said lower engagement surface is held against said lower contact surface with a holding force provided by said connectors; and
    a tool support member having a first portion coupled to said detachable base and a second portion configured for supporting an agricultural tool.

16. The system according to claim 15, wherein said detachable base and said positioning structure are configured such that said holding force provided by said connectors forces said projection further into said upper recess.

17. The system according to claim 16, wherein said upper recess tapers from a broad opening width to a narrow closed end width, wherein said projection presents a terminal end having a thickness that is between the broad opening width and the narrow closed end width of said upper recess.

18. The system according to claim 15, wherein one of said detachable base and said positioning structure presents a lateral alignment protrusion and the other of said detachable base and said positioning structure presents a lateral alignment recess, wherein said lateral alignment protrusion is received in said lateral alignment recess when said detachable base is coupled to said position structure.

19. The system according to claim 18, wherein detachable base presents said lateral alignment protrusion and said positioning member presents said lateral alignment recess.

20. The system according to claim 19, wherein said lateral alignment protrusion is positioned in said upper recess of said detachable base, wherein said lateral alignment recess is positioned in said upper projection.

21. The system according to claim 15, wherein said lateral positioning structure is configured for (i) semi-permanent attachment to said transverse support bar via bolts or (ii) permanent attachment to said transverse support bar via welding, wherein said first portion of said support assembly comprises a rigid member, wherein said second portion of said support assembly comprises a shock absorbing mechanism, wherein said shock absorbing mechanism is configured to permit movement of said agricultural tool relative to said rigid member when said agricultural tool is impacted by an external force, wherein said agricultural tool comprises a coulter.

\* \* \* \* \*